(12) United States Patent
Dinkelbach

(10) Patent No.: US 11,048,250 B2
(45) Date of Patent: Jun. 29, 2021

(54) MOBILE TRANSPORTATION MEANS FOR TRANSPORTING DATA COLLECTORS, DATA COLLECTION SYSTEM AND DATA COLLECTION METHOD

(71) Applicant: Prüftechnik Dieter Busch AG, Ismaning (DE)

(72) Inventor: Anna-Maria Dinkelbach, Zorneding (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 303 days.

(21) Appl. No.: 16/005,202

(22) Filed: Jun. 11, 2018

(65) Prior Publication Data

US 2018/0356812 A1    Dec. 13, 2018

(30) Foreign Application Priority Data

Jun. 13, 2017    (DE) .................... 10 2017 112 931.6

(51) Int. Cl.
*G05D 1/02* (2020.01)
*H04Q 9/00* (2006.01)
(Continued)

(52) U.S. Cl.
CPC ......... *G05D 1/0022* (2013.01); *G05D 1/0088* (2013.01); *G08C 17/02* (2013.01);
(Continued)

(58) Field of Classification Search
CPC ............... G05D 1/0022; G05D 1/0088; G05D 2201/0207; G08C 17/02; H04N 7/18;
(Continued)

(56) References Cited

U.S. PATENT DOCUMENTS

| 4,818,990 A | 4/1989 | Fernandes |
| 4,885,707 A | 12/1989 | Nichol et al. |

(Continued)

FOREIGN PATENT DOCUMENTS

| DE | 10049506 A1 | 4/2001 |
| DE | 102006003877 B4 | 10/2007 |

(Continued)

*Primary Examiner* — Tyler J Lee
(74) *Attorney, Agent, or Firm* — Barlow, Josephs & Holmes, Ltd.

(57) ABSTRACT

A mobile transportation apparatus for transporting at least one data collector to at least one data collection position has at least one set-down apparatus for setting down the data collector at the data collection position and at least one receiving apparatus for receiving data which the data collector transmits to the transportation apparatus. Accordingly, a data collection system has at least one mobile transportation apparatus and at least one data collector. In a data collection method, at least one data collector is transported to at least one data collection position by way of at least one mobile transportation apparatus and is set down at the said data collection position by a set-down apparatus of the transportation apparatus, the data collector which is arranged at the data collection position collects data, and the collected data is transmitted to the transportation apparatus by the data collector.

10 Claims, 1 Drawing Sheet

(51) Int. Cl.
*H04W 4/38* (2018.01)
*H04Q 9/02* (2006.01)
*G08C 17/02* (2006.01)
*H04W 4/80* (2018.01)
*H04W 76/10* (2018.01)
*H04N 7/18* (2006.01)
*G05D 1/00* (2006.01)

(52) U.S. Cl.
CPC ............... *H04Q 9/00* (2013.01); *H04Q 9/02* (2013.01); *H04W 4/38* (2018.02); *H04W 4/80* (2018.02); *H04W 76/10* (2018.02); *G05D 2201/0207* (2013.01); *H04N 7/18* (2013.01); *H04Q 2209/50* (2013.01)

(58) Field of Classification Search
CPC ........ H04Q 2209/50; H04Q 9/00; H04Q 9/02; H04W 4/38; H04W 4/80; H04W 76/10
See application file for complete search history.

(56) References Cited

U.S. PATENT DOCUMENTS

| | | | |
|---|---|---|---|
| 5,416,321 | A | 5/1995 | Sebastian et al. |
| 5,680,025 | A | 10/1997 | Bowers, III et al. |
| 5,870,699 | A | 2/1999 | Canada et al. |
| 5,983,166 | A | 11/1999 | Matsumoto et al. |
| 6,199,018 | B1 | 3/2001 | Quist et al. |
| 6,298,308 | B1 | 10/2001 | Reid et al. |
| 8,616,308 | B2 | 12/2013 | Morey et al. |
| 9,573,701 | B2 * | 2/2017 | Beardsley ............. B64C 39/024 |
| 9,802,701 | B1 * | 10/2017 | Hawes ................. B64C 39/024 |
| 9,821,475 | B1 * | 11/2017 | Lynn ..................... F24S 30/452 |
| 10,249,200 | B1 * | 4/2019 | Grenier ................. G05D 1/104 |
| 10,745,132 | B1 * | 8/2020 | Kimchi ................. G05D 1/0016 |
| 2003/0234730 | A1 | 12/2003 | Arms et al. |
| 2004/0002835 | A1 | 1/2004 | Nelson |
| 2004/0213319 | A1 | 10/2004 | Lancon et al. |
| 2009/0316524 | A1 * | 12/2009 | Tenghamn ........... G01V 1/3852 367/16 |
| 2010/0268409 | A1 | 10/2010 | Vian et al. |
| 2011/0106313 | A1 | 5/2011 | Lee et al. |
| 2011/0114006 | A1 * | 5/2011 | Jung ..................... G02B 6/4471 114/312 |
| 2012/0016538 | A1 | 1/2012 | Waite et al. |
| 2012/0250010 | A1 | 10/2012 | Hannay |
| 2012/0262708 | A1 | 10/2012 | Connolly |
| 2013/0090764 | A1 * | 4/2013 | Summer .............. G05D 1/0016 700/260 |
| 2013/0233964 | A1 | 9/2013 | Woodworth et al. |
| 2014/0024313 | A1 | 1/2014 | Campbell |
| 2014/0072220 | A1 | 3/2014 | Goodman et al. |
| 2014/0121996 | A1 | 5/2014 | Piety et al. |
| 2014/0135991 | A1 | 5/2014 | Summer et al. |
| 2014/0236390 | A1 | 8/2014 | Mohamadi |
| 2015/0117466 | A1 * | 4/2015 | Summer ............... H04L 1/0019 370/465 |
| 2015/0148955 | A1 | 5/2015 | Chin et al. |
| 2015/0205298 | A1 | 7/2015 | Stoschek et al. |
| 2015/0269792 | A1 | 9/2015 | Wood |
| 2016/0039541 | A1 * | 2/2016 | Beardsley ............. B64C 39/024 701/2 |
| 2016/0341578 | A1 | 11/2016 | Park et al. |
| 2018/0095133 | A1 | 4/2018 | Kealy |
| 2018/0156770 | A1 * | 6/2018 | Saez ....................... G01N 33/24 |
| 2018/0281657 | A1 * | 10/2018 | Healey ................ G06Q 30/0241 |

FOREIGN PATENT DOCUMENTS

| | | |
|---|---|---|
| DE | 202006018859 U1 | 5/2008 |
| DE | 202008015324 U1 | 5/2010 |
| DE | 102009039812 A1 | 3/2011 |
| DE | 102010046493 B3 | 3/2012 |
| DE | 102011118833 B3 | 1/2013 |
| DE | 202013001191 U1 | 4/2013 |
| DE | 102012003190 A1 | 8/2013 |
| DE | 202014002329 U1 | 5/2014 |
| DE | 102013103343 A1 | 10/2014 |
| DE | 102014015472 A1 | 4/2015 |
| DE | 202015102754 U1 | 7/2015 |
| DE | 102014001702 A1 | 8/2015 |
| DE | 202015102791 U1 | 8/2015 |
| EP | 0999433 A2 | 5/2000 |
| EP | 2003057 A2 | 12/2008 |
| EP | 2527649 A1 | 11/2012 |
| EP | 2565449 A2 | 3/2013 |
| EP | 2813914 A1 | 12/2014 |
| EP | 2879389 A1 | 6/2015 |
| EP | 2930652 A1 | 10/2015 |
| GB | 2041879 A | 9/1980 |
| WO | 9909637 A1 | 2/1999 |
| WO | 2010083619 A1 | 7/2010 |
| WO | 2012140188 A1 | 10/2012 |
| WO | 2012140190 A1 | 10/2012 |
| WO | 2012145780 A2 | 11/2012 |
| WO | 2014177661 A1 | 11/2014 |
| WO | 2015082405 A1 | 6/2015 |

* cited by examiner

MOBILE TRANSPORTATION MEANS FOR TRANSPORTING DATA COLLECTORS, DATA COLLECTION SYSTEM AND DATA COLLECTION METHOD

BACKGROUND OF THE INVENTION

In the field of machine monitoring, the regular collection or retrieval of data which relates to specific measurement or state variables of the machines to be monitored is unavoidable in order to obtain information about specific operating states of the machine after the said data has been analysed. To this end, data collectors have to be arranged at mostly prespecified data collection positions, so that the said data collectors are able to collect the relevant data. Therefore, the subject matter of the present invention is the transportation of data collectors to respective data collection positions. In particular, the invention relates to a data collection system and a data collection method, in which data collection system and data collection method data collectors are set down at data collection positions and then collect data.

Within the scope of so-called "condition monitoring", machines can be monitored by permanently installed systems, as in DE 20 2006 018 859 U1 for example. In the said permanently installed systems, a corresponding sensor system for measuring state variables of the machine and also recording and/or evaluation devices are permanently installed on or close to the machine. In the case of other systems, such as the system known from DE 20 2013 001 191 U1 for example, sensors which measure or detect state variables of the machine are arranged or installed only temporarily on or close to the machine. In both cases, the sensor system measures typical physical measurement variables such as oscillation displacement, oscillation rate and oscillation acceleration of moving and non-moving machine parts which are suitable for providing information about states of the machine. However, other measurement variables may also be suitable for this purpose, such as, for example, the temperature, the visual inspection, the chemical or physical condition of liquids such as transmission oils etc. for example. The data which is collected by the data collector may now be either the measurement values supplied directly by the sensor system or else data which is obtained after conditioning of these measurement values or can be derived from the said measurement values.

Permanently installed systems are advantageous in respect of continuous recording of the machine state at any time. The measurements take place in a largely automatically configured manner. However, the installation of the measurement equipment is complicated and expensive. Furthermore, respective devices have to be provided for each individual machine. In contrast, temporarily installed systems can be used for a large number of machines. No installation costs are incurred apart from those for temporarily fastening the sensors. However, personnel costs are higher in the case of temporarily installed systems since personnel have to be present for the measurement operation.

In this context, it should be taken into account that machines are sometimes installed such that they are extremely inaccessible or measurement points for the sensors can be reached only with difficulty. For example, fans in cooling towers or else assemblies which are installed on roofs can be reached only with difficulty. This leads to a further increase in the installation costs in the case of permanently installed systems but also in the case of only temporarily installed systems since the ability to reach the relevant points is made considerably more difficult for measurement personnel and, under certain circumstances, may even be completely prevented. In some cases, the machine even has to be turned off in order to be able to reach these points and then be switched on again for the measurement operation. This leads to downtimes and an increased time requirement for the measurement operation, this in turn increasing costs. In addition, the risk of harm to operating personnel is increased in these cases.

SUMMARY OF THE INVENTION

The object of the present invention is therefore to arrange data collectors in a quick and cost-effective manner even at data collection positions which can be reached only with difficulty.

This object is achieved by the transportation apparatus, by the data collection system and by method of collecting data according to the present invention. Preferred embodiments are discussed in detail below.

According to the present invention, a mobile transportation apparatus is provided for transporting the data collector to the data collection position, which mobile transportation apparatus has at least one set-down apparatus for setting down the data collector at the data collection position and at least one receiving apparatus for receiving data which the data collector transmits to the transportation apparatus. This transportation apparatus may be, in particular, a so-called drone or a robot as are used in industrial environments, for example, for finding, identifying, recognizing and following moving objects, for photographing, filming, visual and acoustic monitoring and also for cleaning objects and fitting work on objects. The set-down apparatus of the transportation apparatus, which set-down apparatus is provided for setting down the data collector at the data collection position, may be an articulated or extendable apparatus such as, for example, a gripper arm or robot arm. Therefore, the set-down apparatus can be of multi-element design and, in addition or as an alternative, can have one or more sections which can be telescopically pulled apart and pushed together. Furthermore, the set-down apparatus can be designed for gripping or holding the data collector in any desired manner. For example, the set-down apparatus can grip and hold the data collector in a mechanical manner, for example by gripper tongs, or it can hold the data collector in a magnetic manner, for example by an electromagnet, or by suction by a negative pressure being generated by a pumping apparatus of the transportation apparatus.

Autonomously functioning state monitoring of machines can be realized by a data collection system according to the invention which has at least one mobile transportation apparatus of the above kind and also has at least one data collector. In line with the data collection method of the present invention, the data collector is, for this purpose, transported to respective prespecified data collection positions by the transportation apparatus and arranged at the said data collection positions. By way of example, the data collector can be set down or placed on a horizontal surface, which may be the surface of a machine. Furthermore, many machines have system or connection ports with which the data collector can be brought into contact or to which the data collector can be connected, and which do not necessarily have to have a horizontally oriented support face for the data collector. Therefore, system or connection ports can also be formed on the side of the machine and even on a bottom side of the machine. In order to nevertheless be able to connect the data collector to system or connection ports of this kind, various specific types of connection or fastening are provided between the data collector and system or connection port, such as, for example, an interlocking connection between the data collector and system or connection port, a latching connection or a plug-in connection. In addition, the data collector or the respective data collection position, or the system or connection port, or both can be provided with respective permanent magnets or electromagnets in order to hold the data collector in a stable manner in the data collection position. All of these types of connection or fastening are also possible in the case of a horizontal placement or set-down surface for the data collector.

The data collector begins collecting data after being set down at the data collection position. To this end, the data collector can either automatically carry out measurements itself or can collect measurement values which it has acquired itself as data or can collect data which has been generated on the basis of the said measurements or can collect already existing or provided data by reading the said data from a data memory. If the data collector is intended to carry out measurements itself, it can be equipped with at least one corresponding data acquisition device, such as, for example, a sensor which acquires respective measurement values or measurement data, for this purpose. If, however, the data collector reads out data from a data memory, the data collector can be provided with at least one interface by way of which it can be connected, at the data collection position, to a corresponding interface to a data memory which contains the data to be read out, in order to be able to access the data in the data memory via this connection and to be able to read out the said data.

Following the collection of the data, the collected data is transmitted to the transportation apparatus by the data collector. The data can be buffer-stored in the transportation apparatus or can be forwarded to an external receiving device. It is likewise possible to already process or evaluate the data in the transportation apparatus and to store the result of this processing or evaluation in the transportation apparatus or to forward the said result to an external receiving device. The forwarded data or processing and/or evaluation results can be stored by the receiving device in a database for subsequent use or can be transmitted to one or more corresponding points for further processing. Finally, the transportation apparatus picks up the data collector again by way of the set-down apparatus and moves away from the data collection position and/or transports the data collector onwards from the data collection position.

Following the transmission of the data, the data collector is preferably transported to a further data collection position by the transportation apparatus and set down at the said further data collection position. Therefore, successive items of data can be collected at several data collection positions by the same data collector.

In order to transmit data which has been collected by the data collector to the transportation apparatus, any desired data transmission connections can very generally be provided between the transportation apparatus and the data collector. For example, the transportation apparatus can be designed to establish a wireless and/or a cable-bound data transmission connection to the data collector. In order to establish the wireless data transmission connection, the transportation apparatus can have, for example, at least one serial or at least one analogue or at least one IrDA (Infrared Data Association) interface or at least one Bluetooth interface or at least one WLAN (Wireless Local Area Network) interface or at least one NFC (Near Field Communication) interface or any other wireless data transmission interface. If the transportation apparatus is designed to establish a cable-bound data transmission connection to the data collector, the said transportation apparatus can likewise have at least one serial or at least one analogue interface or at least one USB (Universal Serial Bus) interface or at least one UART (Universal Asynchronous Receiver Transmitter) interface or any other line-bound analogue or digital interface. Furthermore, the transportation apparatus and the data collector can have interfaces to any desired local or global networks, such as the Internet, in order to transmit the data from the data collector to the transportation apparatus or from the transportation apparatus to an external receiving device via the respective network.

The transportation apparatus preferably has at least one cable roller for rolling up a cable of the cable-bound data transmission connection. The cable roller can be of any desired design in principle. The cable roller and the cable which runs from the cable roller to the data collector can be used to maintain a vibration-damped connection between the transportation apparatus and the data collector during the collection of the data and also during the transmission of the said data from the data collector to the transportation apparatus. In addition, a drop-prevention device is provided for the data collector in this way if, for whatever unforeseen reasons, such as severe vibrations for example, the said data collector should become detached from the data collection position or the system or connection port. Other forms of cable guidance are also conceivable.

The transportation apparatus can move autonomously or can be remotely controlled and can further be designed to be moved along by air, land and/or sea. Autonomously moving transportation apparatus follow either a fixed path according to a prespecified program or a destination is prespecified for them, for example the location of a data collection position or of a system or connection port for the data collector, wherein the transportation apparatus seeks the path to its destination itself. In both cases, no human assistance is required by the transportation apparatus for transporting and setting down the data collector at the data collection position. Remotely controlled transportation apparatus can be remotely controlled by an external control apparatus or an external control computer or manually by a person via a remote control arrangement. Small mobile flyable transportation apparatus are commonly called drones and autonomously mobile transportation apparatus which are moved along by land or sea are called robots, wherein the term robot can also be considered to be an umbrella term for an autonomously mobile drone or an autonomously mobile drone can be considered to be a flyable robot.

The data collector can be held by the set-down apparatus during the transportation by the transportation apparatus. However, the transportation apparatus is preferably provided with a receiving device for receiving at least one data collector during the transportation. Therefore, not only is it possible to simultaneously transport more than one data collector by way of the transportation apparatus, but the receiving device can, as a result, additionally assume a position, for example a folded-in or retracted position, in which it does not impede or facilitates the continued movement of the transportation apparatus during the transportation.

The transportation apparatus preferably has at least one camera. In particular, autonomously moving transportation apparatus can be provided with a camera in order to allow orientation of the transportation apparatus. Furthermore, the camera can be designed to record the movement of the transportation apparatus for documentation purposes.

The transportation apparatus likewise preferably has at least one control unit. The control unit can be designed to control the data collector or an autonomous movement or another operation of the transportation apparatus. However, a plurality of control units can also be provided, the said plurality of control units being designed for different functions, for example a first control unit for controlling the data collector and a second control unit for controlling an autonomous movement of the transportation apparatus and respective further control units for controlling other operations of the transportation apparatus. The control unit may be, in particular, a microprocessor or the said control unit may have a microprocessor. A microprocessor of this kind can advantageously be used for processing the data which is transmitted to the transportation apparatus by the data collector.

The transportation apparatus is advantageously provided with at least one data memory. The data which is transmitted to the transportation apparatus by the data collector and also results which are obtained by processing the said data can be stored or buffer-stored in the said data memory. The data memory is preferably a bulk memory in order to also be able to manage relatively large quantities of data by way of the transportation apparatus or the data collection system.

Furthermore, the transportation apparatus advantageously has at least one communications interface. The transportation apparatus can forward the data which is transmitted to the transportation apparatus by the data collector, immediately after the said data is received, to an external receiver point or receiver apparatus via the said communications interface. However, the said data can also be forwarded after the data collector has been picked up by the set down device again and as the transportation apparatus moves away from the data collection position or only after the transportation apparatus has returned to the location from which it started moving.

The transportation apparatus can further have a device for near-field communication. The transportation apparatus can communicate, by way of example, with the set-down data collector by the said device, in order to control the operation of the said data collector or to control the transmission of collected data to the transportation apparatus. The device for near-field communication can additionally enable the transportation apparatus to identify prespecified data collection positions, such as system or connection ports for example, in the near field.

Furthermore, the transportation apparatus can have at least one transceiver system for automatically and contactlessly identifying and locating objects using radio waves. A system of this kind can also enable the identification of prespecified or suitable data collection positions. The said system may be, in particular, an RFID (Radio-Frequency Identification) system.

Similarly, the transportation apparatus can be designed for optical image recognition. The transportation apparatus is able to recognize prespecified or suitable data collection positions in this way too.

Accordingly, in a preferred embodiment of the data collection method, data collection positions can be identified by the transportation apparatus by near-field communication or by a transceiver system for automatically and contactlessly identifying and locating objects using radio waves or by optical image recognition. Therefore, an autonomously moving transportation apparatus can move in a controlled manner to a prespecified data collection position initially on the basis of prespecified coordinates, in order to then ultimately recognize the said data collection position using one or more of the said devices as soon as the transportation apparatus is in the vicinity of the data collection position.

In a preferred embodiment of the data collection system, the device for near-field communication or the transceiver system for automatically and contactlessly identifying and locating objects using radio waves or optical image recognition are arranged in the data collector and not in the transportation apparatus. In other embodiments, both the transportation apparatus and also the data collector have systems of this kind. In the data collection system according to the invention and also in the transportation apparatus according to the invention, these systems can be arranged in the set-down apparatus of the transportation apparatus, for example next to a set of gripper tongs.

In a further preferred embodiment of the present invention, the data collector is designed as part of an orientation system for orienting rotation axes of two rotatably mounted bodies in an aligned manner. In cases of this kind, at least one further system element of the orientation system is transported from the transportation apparatus and set down at a respective prespecified position in addition to the data collector in a preferred embodiment of the data collection method. Orientation systems of this kind are usually optoelectronic systems comprising a light emission apparatus for emitting a light beam and a light detection apparatus which has a light-sensitive surface, wherein the position at which a light beam which is emitted by the light emission apparatus strikes the light-sensitive surface can be registered. Accordingly, the data collector can be designed, for example, as a light detection apparatus of an optoelectronic orientation system of this kind, whereas the additional system element of the orientation system, which additional system element is transported by the transportation apparatus, may be a light emission apparatus.

BRIEF DESCRIPTION OF THE DRAWING FIGURES

The invention will be explained in more detail below with reference to preferred embodiments and with the aid of drawings, in which.

DESCRIPTION OF THE INVENTION

Figure 1:
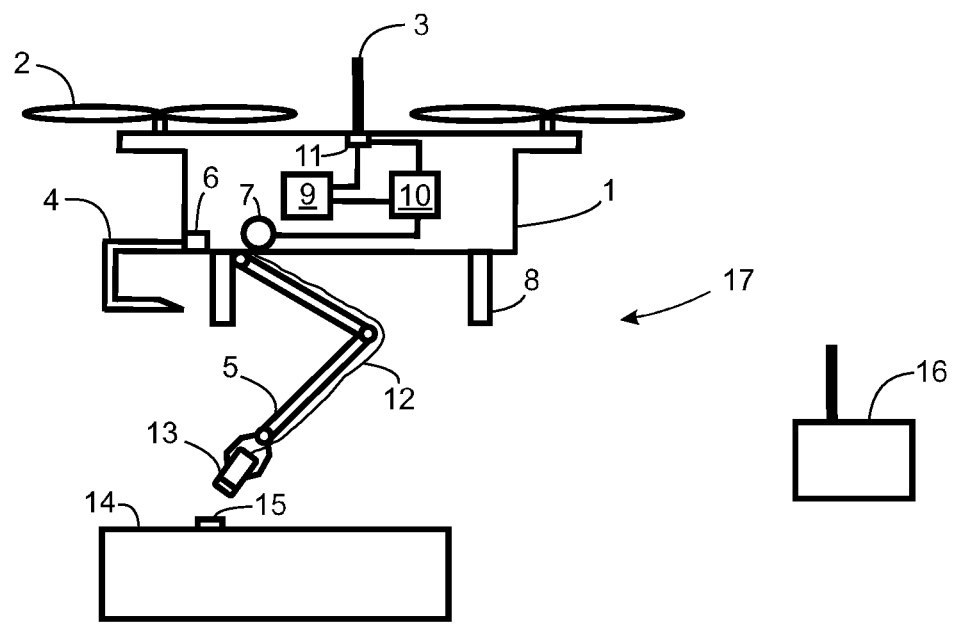
FIG. 1 shows a transportation apparatus and a data collector with a cable-bound data transmission connection.

FIG. 1 is a highly schematic illustration of a mobile transportation apparatus in the form of a drone 1. Although the drone 1 has propellers 2, and consequently is flyable, it should be noted that, in other embodiments, a robot which can be moved on land or sea could be used instead of the flyable drone 1, for example, without restricting the general nature. In addition to the propellers 2, the drone 1 has an antenna 3, a receiving device or magazine 4, a set-down apparatus in the form of an extendable and retractable articulated gripper arm 5 which is shown in the extended state in FIG. 1, a camera 6, a cable roller 7 and also standing legs 8. By way of the standing legs 8, the drone 1 sits on a supporting substrate in the landed state. Furthermore, a drone controller 9 and a control unit 10 are provided in the drone 1, the said drone controller and control unit each being connected to a radio unit 11, which is connected to the antenna 3, and also to one another. In addition, the control unit 10 is connected to a cable 12 which is wound up on the cable roller 7, one end of the said cable leading to a data collector 13 which is held by the gripper arm 5 in FIG. 1. As an alternative, a single control unit can be provided for the tasks of both the drone controller 9 and also the control unit 10, the said single control unit replacing the said drone controller and control unit.

Data is intended to be collected by the data collector 13 at a connection port 15 which is provided on a machine 14 for this purpose. To this end, the data collector 13 has either a sensor, not shown in FIG. 1, in order to generate corresponding measurement values as data after the data collector 13 is arranged or positioned at the connection port 15, or else the data is stored in a data memory, not shown in FIG. 1, which the data collector 13 reads via an interface, provided for this purpose and not shown in FIG. 1, after being arranged or positioned at the connection port 15. In both cases, the data collector 13 initially has to be transported to the connection port 15 and then arranged or positioned at the said connection port.

The drone 1 is now provided for the task of transporting the data collector 13 to the connection port 15 and of arranging the said data collector at the connection port 15. In the present case, this can be partially radio- or remote-controlled by a transceiver device 16. In particular, a start command can be transmitted by the transceiver device 16 to the drone 1. In other embodiments, the drone 1 moves autonomously and control of the drone 1 is completely taken over by the drone controller 9 of the said drone, without external control commands having to be received for this purpose. The transceiver device 16 may be, in particular, a handheld measuring device for state monitoring, the data memory of a computer, an Internet cloud or very generally a database which can be located anywhere.

In order to prepare for the transportation of the data collector 13 to the connection port 15, the data collector 13 is arranged in the magazine 4 of the drone 1. In addition to the data collector 13, the magazine 4 can be fitted with further data collectors or other devices which are to be transported by the drone 1 to respective other positions or locations. Furthermore, coordinates which identify the site of the machine 14 are loaded into the drone controller 9 and coordinate data for the data collector 13, which data is required for operating the said data collector, are loaded into the control unit 10. In contrast to FIG. 1, the gripper arm 5 assumes a retracted state. After conclusion of these preparatory measures, the drone is started. The corresponding command for this is issued to the drone 1 by the transceiver device 16 via manual control or automatically, wherein the drone 1 receives this command via the antenna 3.

The drone 1 is now moved in a controlled manner by the drone controller 9 to the location which is identified by the coordinates of the machine 14. The drone controller 9 can be assisted in this task by control commands which are received by the antenna 3 and passed to the drone controller 9 by the radio unit 11. In addition, the drone controller 9 is assisted by the camera 6 by way of which any obstacles in the movement direction of the drone 1 are noticed, so that the drone 1 can be correspondingly diverted by the drone controller 9 in order to avoid these obstacles.

After reaching the location identified by the coordinates of the machine 14, the drone controller 9, which has an optical image recognition device, identifies the connection port 15 by the camera 6 and also the coordinates and moves the drone 1 into the vicinity of the said connection port. If the data collector 13 is not yet connected to the cable 12, the connection between the cable 12 and the data collector 13 is established by the gripper arm 5 which is controlled by the drone controller 9. The gripper arm 5 then grasps the data collector 13, removes the said data collector from the magazine 4 and sets the said data collector down on the connection port 15 in the intended manner. After the data collector 13 is freed or released by the gripper arm 5, the cable roller 7 dispenses such an amount of cable 12 that the data collector 13 is vibration-decoupled from the drone 1 but is still connected to it.

The drone controller 9 now informs the control unit 10 that the data collector 13 is seated on the connection port 15. The control unit 10 identifies the connection port 15 by NFC, RFID or in an optical manner and starts operation of the data collector 13. The operation of the data collector 13 is controlled by the control unit 10 on the basis of the coordinate data.

Data is now collected by the data collector 13, which is set-down or positioned on the connection port 15, in one of the ways described above, that is to say the said data is either generated by the data collector 13 itself or is read out from a memory by the data collector. Collected data is transmitted to the control unit 10 by the cable 12, which creates a cable-bound data transmission connection to the control unit 10, and received by the said control unit. The control unit 10 stores this data, evaluates it and also stores the evaluation results. If desired, the control unit 10 can transmit the data and evaluation results to the transceiver device 16 by the radio unit 11 and the antenna 3.

If the control unit 10 establishes that the data collector 13 has correctly concluded the process of collecting the data, it shares this with the drone controller 9. The said drone controller then prompts the gripper arm 5 to pick up the data collector 13 again and store it in the magazine 4. After the gripper arm 5 has been retracted, the drone 1 moves away from the machine 14 in order to set down the data collector 13 or another data collector which is located in the magazine 4 possibly at another data collection position or another connection port of the same machine 14 or another machine.

After data has been collected from all of the data collection positions or connection ports provided for this purpose, the drone 1 flies to a prespecified landing site and lands there. If it has not already taken place, the data which is stored in the drone and also the evaluation results can now be transmitted to an intended receiver, such as the transceiver device 16 for example, by the radio unit 11 and the antenna 3 or via a customary wired interface.

The drone 1 which is described in connection with FIG. 1 can be used independently of the specific design of the data collector 13 for data collectors of different design. However, the drone 1 and the data collector 13 can also be matched to one another and jointly form a data collection system 17 which comprises the drone 1 and the data collector 13, the manner of operation of the said data collection system not differing from that just described.

Figure 2:
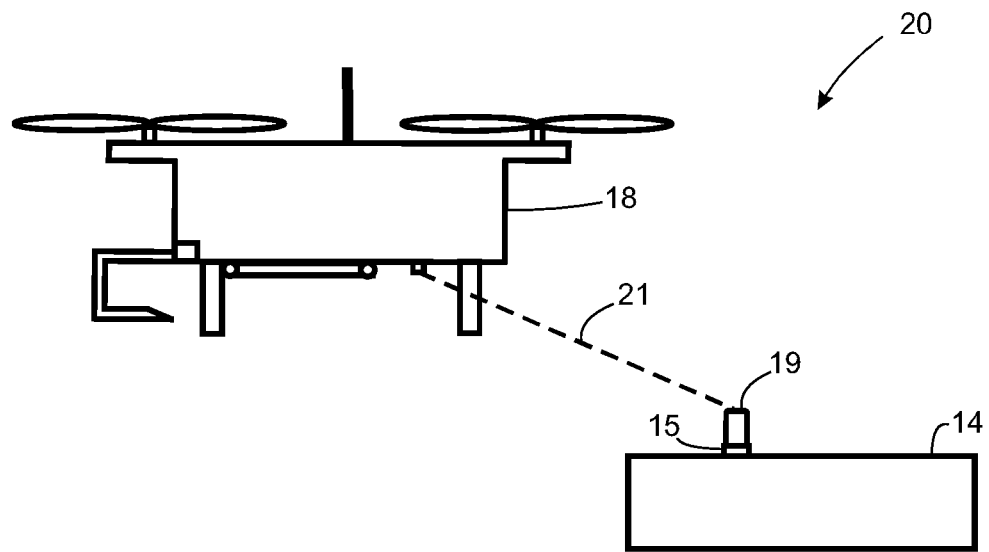
FIG. 2 shows a transportation apparatus and a data collector with a wireless data transmission connection.

A further data collection system 20 which comprises a drone 18 and a data collector 19 is illustrated in FIG. 2. The data collection system 20 is shown in FIG. 2 during the collection of data by the data collector 19, wherein the data collector 19, like the data collector 13 described above, is positioned on the connection port 15 of the machine 14 in order to collect the data. In contrast to FIG. 1, the data collector 19 of the data collection system 20 is not connected to the drone 18 by a cable-bound data transmission connection, but rather by a wireless data transmission connection 21. Apart from this difference, the manner of operation of the data collection system 20 corresponds to that of the above-described data collection system 17.

It would be appreciated by those skilled in the art that various changes and modifications can be made to the illustrated embodiments without departing from the spirit of the present invention. All such modifications and changes are intended to be covered by the appended claims.

What is claimed is:

1. A mobile transportation apparatus for transporting at least one data collector to at least one data collection position, which mobile transportation device has
    at least one set-down apparatus for setting down the data collector at the data collection position, said at least one set-down apparatus comprises an extendible and retractable articulated arm having a gripper at a distal end, wherein the data collector is retained by the gripper, and
    at least one receiving apparatus for receiving data which the data collector transmits to the transportation apparatus,
    wherein said mobile transportation device is a flying drone comprising at least one propeller configured to enable said flying drone to become airborne, and
    wherein the extendible and retractable arm includes an optical image recognition device for autonomously identifying a portion of the data collector.

2. The transportation apparatus according to claim 1, which is configured and arranged to establish a wireless data transmission connection and/or a cable-bound data transmission connection to the data collector.

3. The transportation apparatus according to claim 2, comprising at least one cable roller for rolling up a cable of the cable-bound data transmission connection.

4. The transportation apparatus according to claim 1, wherein the transportation apparatus moves autonomously or can be remotely controlled, and which is configured and arranged to be moved along by air, land or sea.

5. The transportation apparatus according to claim 1, further comprising:
    at least one receiving device for receiving at least one data collector during the transportation; and/or
    at least one camera; and/or
    at least one control unit; and/or
    at least one data memory; and/or
    at least one communications interface; and/or
    at least one device for near-field communication; and/or
    at least one transceiver system for automatically and contactlessly identifying and locating objects using radio waves; and/or
    an optical image recognition device.

6. The transportation apparatus according to claim 1, comprising at least one of the mobile transportation apparatus and at least one data collector, wherein the data collector is configured and arranged to read out data from at least one data memory, or
has at least one data acquisition device for acquiring data, or
is configured and arranged as part of an orientation system for orienting rotation axes of two rotatably mounted bodies in an aligned manner.

7. A method for collecting data, comprising the steps of:
transporting at least one data collector to at least one data collection position by way of at least one mobile transportation apparatus;
setting down the at least one data collector at the data collection position by a set-down apparatus of the transportation apparatus, said set-down apparatus comprises an extendible and retractable articulated arm having a gripper at a distal end, wherein the at least one data collector is retained by the gripper;
arranging the data collector at the data collection position;
identifying, autonomously, a portion of the data collector with an optical image recognition device disposed on the extendible and retractable arm;
collecting data by the data collector; and
transmitting the collected data to the transportation apparatus by the data collector,
wherein said at least one mobile transportation apparatus is a flying drone comprising at least one propeller configured to enable said flying drone to become airborne.

8. The method according to claim 7, in which, following the transmission of the data, the data collector is transported to a further data collection position by the transportation apparatus and is set down at the further data collection position.

9. The method according to claim 7, wherein data collection positions are identified by the transportation apparatus by near-field communication or by a transceiver system for automatically and contactlessly identifying and locating objects using radio waves or by optical image recognition.

10. The method according to claim 7, wherein
the data collector collects the data by reading out the data from at least one data memory or records the data by way of at least one data acquisition device, or
the data collector is configured and arranged as part of an orientation system for orienting rotation axes of two rotatably mounted bodies in an aligned manner and, in addition to the data collector, at least one further system element of the orientation system is transported by the transportation apparatus and is set down at a respective prespecified position.

* * * * *